United States Patent [19]

Ohmori

[11] Patent Number: 4,898,249

[45] Date of Patent: Feb. 6, 1990

[54] ROTARY ELECTRIC TOOL

[75] Inventor: Toshitaka Ohmori, Saitama, Japan

[73] Assignee: Olympic Co., Ltd., Saitama, Japan

[21] Appl. No.: 215,553

[22] Filed: Jul. 5, 1988

[30] Foreign Application Priority Data

Aug. 5, 1987 [JP] Japan .......................... 62-120940[U]

[51] Int. Cl.[4] ...................... B23Q 5/12; B25B 23/151

[52] U.S. Cl. ...................................... 173/12; 173/163; 81/469; 81/473; 475/153; 475/263; 475/266; 475/299

[58] Field of Search .................... 173/163, 12; 74/751; 81/467, 469, 473, 57.14, 470

[56] References Cited

U.S. PATENT DOCUMENTS

| | | | |
|---|---|---|---|
| 2,936,662 | 5/1960 | Apicelli | 81/470 |
| 3,187,860 | 6/1965 | Simmons | 74/751 |
| 3,610,343 | 10/1971 | Bratt | 173/12 |
| 3,739,659 | 6/1973 | Workman, Jr. | 74/751 |
| 3,845,673 | 11/1974 | Kardén et al. | 74/751 |
| 4,173,059 | 11/1979 | Hashimoto et al. | 81/469 |
| 4,215,594 | 8/1980 | Workman, Jr. et al. | 74/751 |
| 4,487,270 | 12/1984 | Huber | 81/469 |
| 4,617,843 | 10/1986 | Nishida et al. | 81/469 |

FOREIGN PATENT DOCUMENTS 59-15764 4/1984 Japan .

*Primary Examiner*—Frank T. Yost
*Assistant Examiner*—Scott A. Smith
*Attorney, Agent, or Firm*—Sandler & Greenblum

[57] ABSTRACT

A rotary electric tool in which a differential gear mechanism is mounted within a gear case fixed to a housing for example; projections are formed on the outer peripheral surface of an internal gear of a final planetary gear mechanism in the differential gear mechanism, the said projections being brought into engagement with a projection-formed surface of a torque adjusting cam; the internal gear and the torque adjusting cam can be changed in relative position axially by reaction force of the internal gear; and the rotation of an output shaft is changed over between high and low speed conditions according to an axial displacement of the internal gear.

19 Claims, 2 Drawing Sheets

ROTARY ELECTRIC TOOL

BACKGROUND OF THE INVENTION

1. Field of the Invention:

The present invention relates to a rotary electric tool such as a motor-driven screw driver or drill. More particularly, it is concerned with a rotary electric tool equipped with a variable speed gearing using a differential gear mechanism and also equipped with a torque adjusting cam.

2. Prior Art:

Conventional motor-driven screw-drivers and drills generally employ a torque adjusting cam as well as balls and springs as a torque setting structure.

It is the recent desire that the speed of the output shaft be changeable; for example, an automatic two-step speed changing mechanism has recently been desired. And it is necessary that the control for changing speed be made according to increase or decrease of the load exerted on the output shaft relative to a preset torque value.

In order to attain both functions of torque control and speed change using a combined structure of the aforementioned torque adjusting cam and balls, it is necessary that the engaged portion (axial depth) of the balls and the torque adjusting cam be taken large. This is because a speed change signal must be generated before slipping of the torque adjusting cam and to this end it is necessary for the torque adjusting cam to have a corresponding stroke of movement.

Therefore, the ball diameter becomes large for attaining the object in the above-mentioned structure, resulting in that the entire system becomes larger in size (larger in outside diameter).

SUMMARY OF THE INVENTION

The present invention has been accomplished in view of the above circumstances involved in the prior art, and it is the object thereof to provide a rotary electric tool capable of effecting both adjustment of torque and control for changing speed without increase in size of the entire system.

According to the technical means adopted by the present invention to achieve the above-mentioned object, a differential gear mechanism is mounted within a gear case which is fixed to a housing for example, and projections are formed on the outer peripheral surface of an internal gear of a final planetary gear mechanism in the differential gear mechanism, which projections are brought into engagement with a projection-formed surface of a torque adjusting cam, the internal gear and the torque adjusting cam can be changed in relative position axially by reaction force of the internal gear, and the rotation of an output shaft is changed over between high and low speed conditions according to an axial displacement of the internal gear. As examples of mechanisms which change speed on the basis of an axial movement of the internal gear, there are mentioned mechanical and electrical control mechanisms.

In the above construction, when a load exceeding the preset torque value is imposed on the output shaft, the internal gear of the final planetary gear mechanism in the differential gear mechanism which transmits power to the output shaft is rotated by reaction force and is thereby moved axially, generating a speed change control signal. Upon further increase of the load, the internal gear and the torque adjusting cam are integrally engaged with each other, slipping against the balls to cut off the transmission of power to the output shaft.

DESCRIPTION OF A PREFERRED EMBODIMENT

Figure 1:
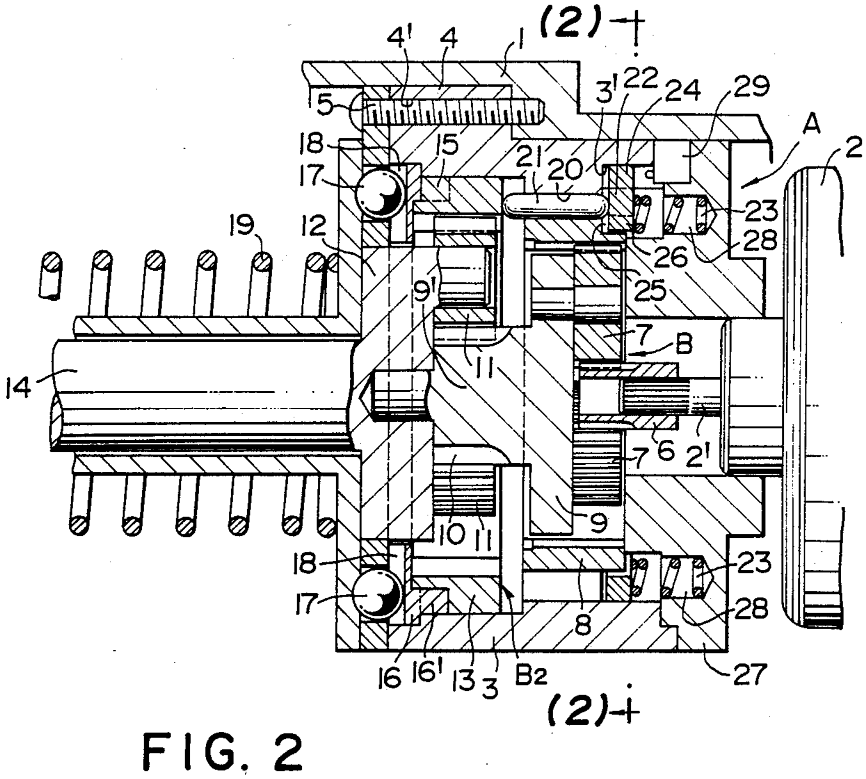
FIG. 1 is a sectional view of an embodiment of the present invention which is in a rotating condition at high speed.
Figure 2:
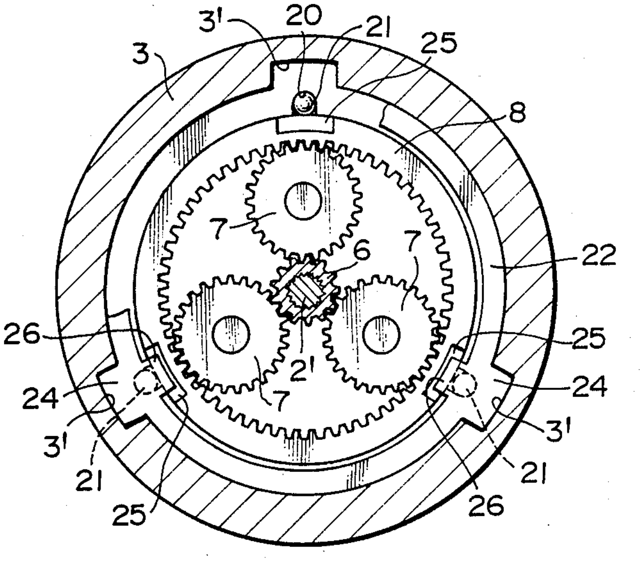
FIG. 2 is a sectional view taken along line (2)—(2) of FIG. 1.
Figure 3:
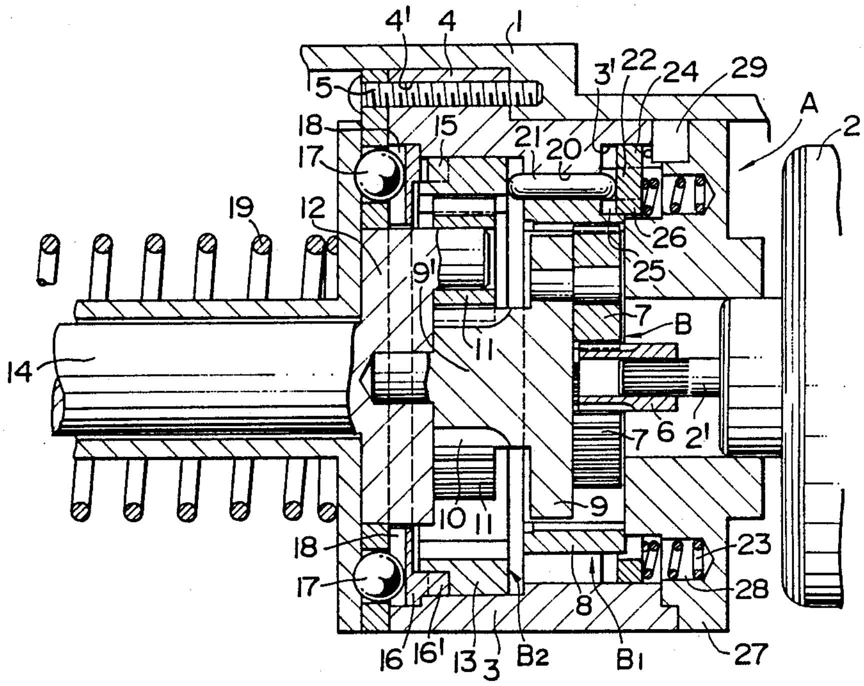
FIG. 3 is a sectional view in a changed-over condition to low speed rotation.

An embodiment of the present invention will be described hereinunder with reference to the accompanying drawings.

Numeral 1 denotes a housing of a motor-driven drill or screw driver. In front of a motor 2 mounted fixedly in the housing 1 is provided a variable speed gearing A for changing the number of revolutions. The variable speed gearing A is composed of a gear case 3 and a differential gear mechanism B mounted within the case 3. The gear case 3 is in the form of a cylinder having open ends. The outer peripheral surface thereof is formed with plural mounting lugs 4 each having a machine screw insertion holes 4', and the gear case 3 is fixed to the housing 1 with machine screws 5 through the insertion holes 4'.

The differential gear mechanism B mounted inside the gear case 3 is composed of two stages of planetary gear mechanisms $B_1$ and $B_2$. Planetary gears 7 in the first-stage planetary gear mechanism $B_1$ are in mesh with a pinion 6 which is fixed onto a rotative shaft 2' of the motor 2, whereby the rotation of the motor is input to the differential gear mechanism B.

The first planetary gear mechanism $B_1$ is composed of three planetary gears 7, an internal gear 8 meshing with the planetary gears 7, and a support plate 9 which supports the planetary gears 7. A shaft 9' is fixed integrally to the center of the support plate 9 to support not only a cylindrical shaft portion 8' of the internal gear 8 but also the second planetary gear mechanism $B_2$.

The second planetary gear mechanism $B_2$ is composed of four planetary gears 11 which are in mesh with a sun gear 10 formed on the shaft 9' of the support plate 9 in the first planetary gear mechanism $B_1$, a support plate 12 which supports the planetary gears 11, and an internal gear 13 meshing with the planetary gears 11. An output shaft 14 is formed integrally at the center of the support plate 12. On the outer peripheral surface of the internal gear 13 are formed projections 15 of a trapezoidal section at equal intervals in the circumferential direction, and a torque adjusting cam 16 having projections 16' adapted to be engaged with and disengaged from the projections 15 fitted in the front portion of the gear case 3. Further, recesses 18 for fitting balls 17 therein are formed in the face of the torque adjusting cam 16 on the side opposite to the side where the projections 16' are formed. The force of a spring 19, whose biasing force is varied by turning of a torque adjusting knob (not shown), is exerted on the torque adjusting cam 16 through the balls 17. More specifically, within the range of a torque which has been set by turning the torque adjusting knob, the internal gear 13 and the torque adjusting cam 16 are engaged with each other to prevent the rotation of the planetary gears 11, while when a load exceeding the preset torque is imposed on the output shaft 14, the internal gear 13 meshing with the planetary gears 11 rotates and is pushed out backward (rightward in the drawing) beyond the projections 16' of the torque adjusting cam 16.

The axial movement o the internal gear 13 which operates upon detection of an increase or decrease of the load relative to the preset torque causes backward movement of slide pins 21 fitted in slots 20 formed inside the gear case 3, whereby the gear case 3 and the internal gear 8 in the first planetary gear mechanism $B_1$ are engaged and connected with each other to push a change-over disk 22 which has stopped the rotation of the internal gear 8 backward against the biasing force of a spring 23. This movement of the change-over disk 22 causes a limit switch 29 to operate to control the electric current for the rotation of the motor 2.

The change-over disk 22, which is a doughnut-shaped disk, is provided outside with engaging lugs 24 fitted in and engaged with retaining recesses 3' of the gear case 3, and also provided inside with retaining lugs 26 fitted in and engaged with notches 25 of the internal gear 8.

Further, springs 23 for urging the change-over disk 22 in the direction of engagement with the gear case 3 and the internal gear 8 are mounted within mounting holes 28 formed in the front face of a motor base 27. The depth of engagement, l, of the projections 15 of the internal gear 13 and the projections 16' of the torque adjusting cam 16 is set larger than the gap 1' between the front end face of the gear case 3 and the rear end face of the internal gear 13.

The operation of the above variable speed gearing will now be explained. In a load condition smaller than the preset torque value, the rotation of the rotative shaft 2' of the motor 2 is transmitted as follows: pinion 6 (forward rotation) → planetary gears 7 (reverse rotation) → support plate 9 (sun gear 10) (forward rotation) → planetary gears 11 → support plate 12 → output shaft 14, whereby a drill or a screw tightening tool connected to the output shaft is rotated. This is the driving path for the so-called high speed rotation.

During the above high speed rotation, when the load on the tool increases to a level exceeding the preset torque at the final screwing sage, the rotation of the output shaft 14 connected with the tool decreases, while the planetary gears 11 continue to rotate in their normal positions, so that the internal gear 13 meshing with the planetary gears 11 is rotated and moves in the axial direction (rightward in the drawing) to get over the projections 16' of the torque adjusting cam 16, whereby the slide pins 21 are forced out backward to push the change-over disk 22 backward against the biasing force of the springs 23. The change-over disk 22 thus pushed out backward presses and turns ON the limit switch 29 disposed behind and near the change-over disk, whereupon the rotation of the motor 2 is changed to low speed rotation by electric current control and this slowed-down rotation is transmitted to the differential gear mechanism B to let the output shaft 14 rotate at low speed, resulting in increased torque. The above movement of the change-over disk 22 is the only distance required for actuating the limit switch 29. The engagement of the gear case 3 and the internal gear 8 is maintained even in the actuated condition of the limit switch 29.

Upon further increase of the torque, the internal gear 13 and the torque adjusting cam 16 are integrally engaged with each other, slipping against the balls 17 to cut off the transmission of power to the output shaft 14.

Although in the construction of the above embodiment the axial movement of the internal gear 13 causes the limit switch to operate and the rotation of the output shaft is changed over between high and low speed conditions by an electric current control made in response to the operation of the limit switch, the axial displacement of the internal gear is applicable to not only such electrical operation but also mechanical operation for changing speed.

Since the rotary electric tool of the present invention is constructed as above, it can attain both functions of adjusting torque and changing speed while keeping the conventional size intact, that is, without enlarging the outside diameter of the entire system, despite the mechanism using balls and the torque adjusting cam.

What is claimed is:

1. A rotary electric tool comprising a differential gear mechanism mounted within a gear case projections formed on the outer peripheral surface of an internal gear of a final planetary gear mechanism in the different gear mechanism, said projections being brought into engagement with a projection-formed surface of a torque adjusting cam, a spring for biasing said torque adjusting cam toward said internal gear by means of balls interposed between said spring and said torque adjusting cam, the internal gear and the torque adjusting cam being changed in relative position axially by a reaction force of the internal gear, the rotation of an output shaft being changed over between high and low speed conditions according to an axial displacement of the internal gear.

2. A rotary electric tool according to claim 1, wherein said torque adjusting cam has recesses for fitting said balls therein, said recesses being formed in the face of the torque adjusting cam opposite to the projection-formed surface thereof, and the biasing force of said at least one spring is exerted on the torque adjusting cam through said balls.

3. A rotary electric tool according to claim 2, wherein the biasing force of the springs is adjustable.

4. A rotary electric tool according to claim 2, further comprising a change-over disk which is axially movable by an amount equal to said axial displacement of the internal gear.

5. A rotary electric tool according to claim 4, further comprising a plurality of slide pins axially positioned between said internal gear and said change-over disk for moving said change-over disk in response to said axial displacement of the internal gear.

6. A rotary electric tool according to claim 5, further comprising an electric motor for driving said output shaft, and a limit switch for controlling the speed of said electric motor, whereby, upon movement of said change-over disk said limit switch is actuated to change the speed of said electric motor.

7. A drive apparatus for an output shaft of a rotary electric tool powered by an electric motor, said drive apparatus comprising:

(a) a differential gear mechanism mounted within a gear case for transmitting power from said electric motor, said differential gear mechanism having a final planetary gear mechanism which includes an internal gear having a peripheral surface from which projections extend;

(b) a torque adjusting cam having projections which are engageable with said projections of said internal gear of said final planetary gear mechanism, said internal gear of said final planetary gear mechanism and said torque adjusting cam being configured and arranged within said gear case such that, upon the occurrence of a reaction force of said internal gear due to a change in torque on said output shaft, the relative axial position between said internal gear and said torque adjusting cam is changed to effect a change in rotary speed of said output shaft; and (c) means for biasing said torque adjusting cam in a direction toward said internal gear of said final planetary gear mechanism.

8. The drive apparatus of claim 7, wherein said change in rotary speed of said output shaft is effected in response to the change in axial position only between said internal gear of said final planetary gear mechanism and said torque adjusting cam.

9. The drive apparatus of claim 7, further comprising means for controlling the speed at which said electric motor is driven in response to said change in the relative axial position between said internal gear of said final planetary gear mechanism and said torque adjusting cam.

10. The drive apparatus of claim 9, wherein said controlling means comprises a limit switch having a portion engageable with an axially movable element in response to said change in the relative axial position between said internal gear of said final planetary gear mechanism and said torque adjusting cam.

11. The drive apparatus of claim 10, wherein said controlling means further comprises a changeover disk for engagement with said limit switch and axially positioned slide pins located between said internal gear of said final planetary gear mechanism and said changeover disk for effecting movement of said changeover disk in response to axial movement of said internal gear.

12. The drive apparatus of claim 11, wherein said torque adjusting cam comprises a disk having one face for engagement with said internal gear of said final planetary gear mechanism by means of said projections and an opposite face having recesses, wherein balls are fitted within said recesses, and wherein said means for biasing comprises at least one spring exerting a force via said balls against said torque adjusting cam.

13. The drive apparatus of claim 7, wherein said means for biasing is adjustable.

14. The drive apparatus of claim 7, wherein said final planetary drive mechanism is arranged such that upon an increase in the torque on said output shaft beyond a first predetermined level, said internal gear rotates and moves axially away from said torque adjusting cam.

15. The drive apparatus of claim 14, wherein upon an increase in the torque on said output shaft beyond a second predetermined level, said internal gear and said torque adjusting cam rotate together relative to said gear case and transmission of power to said output shaft is removed.

16. The drive apparatus of claim 7, further comprising a first planetary gear mechanism adapted to be located between said electric motor and said final planetary gear mechanism, wherein said first planetary gear mechanism comprises a plurality of planetary gears in mesh with a pinion fixed upon a rotary shaft of said electric motor, a support plate for supporting said planetary gears, said support plate having affixed thereto a sun gear in mesh with a plurality of planetary gears of said final planetary gear mechanism.

17. The drive apparatus of claim 16, further comprising a second support plate for supporting the planetary gears of said final planetary gear mechanism, the planetary gears of said final planetary gear mechanism being in mesh with the internal gear of said final planetary gear mechanism.

18. The drive apparatus of claim 17, wherein said output shaft is integrally formed at the center of the second support plate.

19. A rotary electric tool having an output shaft driven by a drive apparatus, said drive apparatus comprising:

(a) a differential gear mechanism mounted within a gear case for transmitting power from said electric motor, said differential gear mechanism having a final planetary gear mechanism which includes an internal gear having a peripheral surface from which projections extend;

(b) a torque adjusting cam having projections which are engageable with said projections of said internal gear of said final planetary gear mechanism said internal gear of said final planetary gear mechanism and said torque adjusting cam being configured and arranged within said gear case such that, upon a reaction force of said internal gear due to a change in torque on said output shaft the relative axial position between said internal gear and said torque adjusting cam is changed to effect a change in rotary speed of said output shaft; and (c) means for biasing said torque adjusting cam in a direction toward said internal gear of said final planetary gear mechanism.

* * * * *

UNITED STATES PATENT AND TRADEMARK OFFICE

CERTIFICATE OF CORRECTION

PATENT NO. : 4,898,249

DATED : February 6,1990

INVENTOR(S) : T. OHMORI

It is certified that error appears in the above-identified patent and that said Letters Patent is hereby corrected as shown below:

column 3, line 6, change "o" to ---of---;
column 3, line 29, change "l'" to ---ℓ'---;
column 4, line 20, insert ---,--- before "projections"; and
column 4, line 22, change "different" to ---differential---.

Signed and Sealed this

Fifth Day of May, 1992

*Attest:*

DOUGLAS B. COMER

*Attesting Officer*

*Acting Commissioner of Patents and Trademarks*